(12) United States Patent
Elliott (10) Patent No.: US 10,000,031 B2
(45) Date of Patent: Jun. 19, 2018

(54) METHOD FOR CONTOUR SHAPING HONEYCOMB STRUCTURES

(71) Applicant: Corning Incorporated, Corning, NY (US)

(72) Inventor: Kevin Eugene Elliott, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 881 days.

(21) Appl. No.: 14/480,941

(22) Filed: Sep. 9, 2014

(65) Prior Publication Data

US 2015/0091203 A1   Apr. 2, 2015

Related U.S. Application Data

(60) Provisional application No. 61/883,301, filed on Sep. 27, 2013.

(51) Int. Cl.
*B29D 99/00* (2010.01)
*B28B 11/12* (2006.01)
*B29K 105/04* (2006.01)
*B29L 31/00* (2006.01)

(52) U.S. Cl.
CPC .......... *B29D 99/0089* (2013.01); *B28B 11/12* (2013.01); *B29K 2105/04* (2013.01); *B29L 2031/772* (2013.01)

(58) Field of Classification Search
CPC .. B24B 5/01; B24B 5/37; B24B 9/007; B23Q 15/22; B29D 99/0089; B28B 11/12
USPC .......................................... 451/58, 28, 41, 44
See application file for complete search history.

(56) References Cited

U.S. PATENT DOCUMENTS

| | | | | |
|---|---|---|---|---|
| 4,584,795 A | * | 4/1986 | Akabane | G05B 19/4166 451/21 |
| 5,087,307 A | * | 2/1992 | Nomura | B24B 9/065 156/153 |
| 5,117,590 A | * | 6/1992 | Kudo | B24B 9/065 451/239 |
| 5,487,694 A | | 1/1996 | Deming et al. | 451/49 |
| 5,954,567 A | * | 9/1999 | Nishio | B24B 5/01 451/41 |
| 6,776,689 B2 | | 8/2004 | Eiehelnerger et al. | 451/8 |

(Continued)

FOREIGN PATENT DOCUMENTS

| CN | 101511554 A | 8/2009 |
|---|---|---|
| JP | 63052964 A | 3/1988 |

(Continued)

*Primary Examiner* — Monica Carter
*Assistant Examiner* — Marcel Dion (57) ABSTRACT

A method of manufacturing a honeycomb structure includes providing a honeycomb body having a first contour extending between opposing first and second ends and chamfering a corner of the first end in a radial and axial direction toward the first contour to form a second contour. The method further includes removing material in an axial direction toward the second face to form a third contour, chamfering a corner of the third contour in a radial and axial direction toward the second end to form an end contour, and removing material in an axial direction toward the first face to form a fourth contour. Removing material to form the fourth contour substantially removes the second contour and the end contour.

20 Claims, 7 Drawing Sheets

(56) References Cited

U.S. PATENT DOCUMENTS

| | | | |
|---|---|---|---|
| 6,938,339 B2 | 9/2005 | Hughes et al. | 29/890 |
| 7,309,277 B2 | 12/2007 | Nishio et al. | 451/51 |
| 7,452,263 B2 | 11/2008 | Itoh et al. | 451/11 |
| 7,452,268 B2 | 11/2008 | Annunziata et al. | 463/1 |
| 7,789,929 B2 | 9/2010 | Riley et al. | 55/5.22 |
| 7,909,904 B2 | 3/2011 | Allen et al. | 55/523 |
| 9,210,901 B2 | 12/2015 | Dragonuk et al. | |
| 2006/0289501 A1 | 12/2006 | Michiwaki et al. | |
| 2007/0082584 A1* | 4/2007 | Itoh | B24B 5/04 451/11 |
| 2007/0099548 A1* | 5/2007 | Kumar | B21B 28/04 451/21 |
| 2008/0233345 A1* | 9/2008 | Allen | B24B 7/162 428/116 |
| 2011/0151752 A1* | 6/2011 | Ono | B24B 37/042 451/41 |
| 2014/0087636 A1* | 3/2014 | Fujioka | B24B 1/00 451/41 |

FOREIGN PATENT DOCUMENTS

| | | | | |
|---|---|---|---|---|
| JP | 08099257 A | 4/1996 | | |
| JP | 2006281039 A | 10/2006 | | |
| WO | WO 2008136898 A2 * | 11/2008 | | B28B 7/0085 |

* cited by examiner

METHOD FOR CONTOUR SHAPING HONEYCOMB STRUCTURES

This application claims the benefit of priority under 35 U.S.C. § 119 of U.S. Provisional Application Ser. No. 61/883,301 filed on Sep. 27, 2013 the content of which is relied upon and incorporated herein by reference in its entirety.

BACKGROUND

Field

Exemplary embodiments of the present disclosure relate to manufacture of porous ceramic honeycomb structures, and to the manufacture of porous ceramic honeycomb structures such as substrates and filters.

Discussion of the Background

Ceramic honeycomb structures are widely used as antipollutant devices in engine exhaust systems, such as catalytic converter substrates and gasoline particulate filters (GPF) in automobiles, and diesel particulate filters (DPF) in diesel-powered vehicles. In these applications, the ceramic honeycomb structures are comprised of a matrix of ceramic webs, or walls, which define a plurality of cells or cell channels. The web matrix may be surrounded by a skin layer. In filters, at least some of the channels may be sealed by plugs, such as to force the exhaust to flow through the ceramic webs.

The above information disclosed in this Background section is only for enhancement of understanding of the background of the claimed invention and therefore it may contain information that does not form any part of the prior art nor what the prior art may suggest to a person of ordinary skill in the art.

SUMMARY

Exemplary embodiments of the present disclosure provide a method of manufacturing a honeycomb structure.

Additional features of the disclosure will be set forth in the description which follows, and in part will be apparent from the description, or may be learned by practice of the disclosed exemplary embodiments.

An exemplary embodiment discloses a method of manufacturing a honeycomb structure. The method includes providing a honeycomb body comprising a first contour extending between opposing first and second end faces and chamfering a corner of the first end face in a radial and axial direction toward the first contour to form a second contour. The method further includes removing material in an axial direction toward the second end face to form a third contour extending to the second end face, and removing material in an axial direction toward the first end face to form a fourth contour.

It is to be understood that both the foregoing general description and the following detailed description are exemplary and explanatory and are intended to provide further explanation of the disclosure.

BRIEF DESCRIPTION OF THE DRAWINGS

The accompanying drawings, which are included to provide a further understanding of the disclosure and are incorporated in and constitute a part of this specification, illustrate exemplary embodiments of the disclosure, and together with the description serve to explain the principles of the disclosure.

DETAILED DESCRIPTION OF THE ILLUSTRATED EMBODIMENTS

The disclosure is described more fully hereinafter with reference to the accompanying drawings, in which exemplary embodiments are shown. This disclosure may, however, be embodied in many different forms and should not be construed as limited to the embodiments set forth herein. Rather, these embodiments are provided so that this disclosure is thorough, and will fully convey the scope of the disclosure to those skilled in the art. In the drawings, the size and relative sizes of layers and regions may be exaggerated for clarity. Like reference numerals in the drawings denote like elements.

It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 1A:
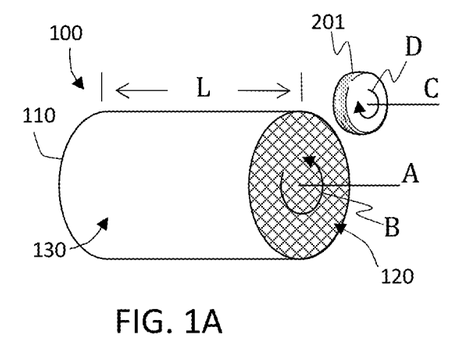
FIG. 1A is a perspective view of a honeycomb body and a grinding wheel.
Figure 1B:
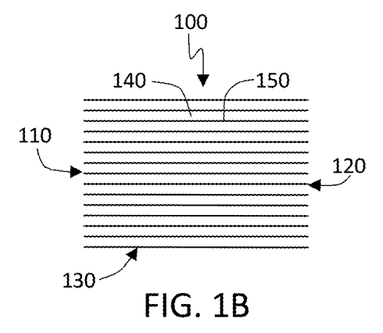
FIG. 1B is a cross sectional view of a honeycomb body.

FIG. 1A is a perspective view of a honeycomb body and a grinding wheel. FIG. 1B is a cross sectional view of the honeycomb body of FIG. 1A. The honeycomb body 100 depicted in FIGS. 1A and 1B may be an extruded body comprising a length "L", a first end face 110, a second end face 120, and a first contour 130 (side surface). The honeycomb body 100 has an array of axially extending channels 140 of length "L" defined by an array of intersecting porous walls 150 extending between the first end face 110 and the second end face 120. The channels 140 may have the same cross sectional open areas as shown in FIGS. 1A and 1B, or may have different cross sectional open areas. The channels 140 may have cross sectional shapes such as circular, elliptical, square, rectangular, triangular, hexagonal, other polygonal, etc., or combinations thereof, and may have rounded corners, square corners or combinations thereof. Further, the intersecting porous walls 150 may be of a substantially constant thickness or may be of various thicknesses. For example, the wall thickness of the intersecting porous walls 150 may be greater near the outer periphery 130 of the honeycomb body 100. As another example, the wall thickness of the intersecting porous walls 150 may be greater in regions at the 45° locations around an axis "A" of the honeycomb body 100.

The honeycomb body 100 may have a skin layer applied on an outer peripheral surface according to exemplary embodiments. The first contour 130 can be a closed cylindrical surface of a circumference greater than the desired outer peripheral surface having the layer of skin applied thereon. The channels 140 of the honeycomb body 100 may be plugged at the first end face 110 and the second end face 120. The first end face 110 may be an inlet end of a wall flow filter having inlet channels plugged at the second end face 120. The second end face 120 may be an outlet end of the filter having channels plugged at the first end face 110. The plugs may be in a checkerboard pattern or in other patterns. Although not shown, the inlet channels may have a larger cross sectional area than the outlet channels. According to exemplary embodiments, the honeycomb body may be green or fired to form a ceramic article such as a diesel or gasoline substrate, filter, or partial filter, and may support a catalyst, such as a washcoat comprising a catalyst.

Thus, in manufacture of cellular ceramic substrates for diesel or gasoline substrate, filter, or partial filter applications it may be necessary to machine (contour) extruded honeycomb bodies to some desired shape and diameter to prepare them for a skinning process according to exemplary embodiments of the disclosure. The desired shape may be circular cross-section so that the honeycomb body has a cylindrical shape, or oval, elliptical, or other shape cross sectional shape. The honeycomb bodies to be machined (contoured) may be green or fired, plugged or unplugged.

A method of machining (contouring) the honeycomb bodies may be through the use of a cylindrical grinder. However, cylindrical grinding may have a slow through put and cause edge chipping of the honeycomb bodies. In order to minimize low through put and edge chipping, tool paths according to exemplary embodiments of the disclosure have been discovered and implemented which enable honeycomb bodies to be machined much faster, for example, as fast as about 6 seconds cutting time for approximately 12 in (30 cm) diameter×approximately 6 in (15 cm) long finished part when removing about 1 in (2.54 cm) from the radius, and results in honeycomb bodies that do not edge chip while removing substantial material off the honeycomb body radius, for example, about 1 inch (2.54 cm) total off the radius.

As will be described in greater detail below, exemplary embodiments of the disclosure implement a trapezoidal or partial trapezoidal tool path method. The method may include traversing a rotating grinding wheel along the length of a rotating honeycomb body in two passes. The first pass may be at or close to the maximum feed rate of the machine. The first pass chamfers the edges of the honeycomb body by moving the grinding wheel radially and axially relative to the honeycomb body at the same time and may remove the majority of material to be removed off the radius of the honeycomb body. The second pass moves the grinding wheel axially, and preferably, at a slower pass rate, to create a desired finish. The second pass can result in the final contoured product. The final contoured product may be subsequently fired, plugged, skinned, etc., as previously mentioned.

Exemplary embodiments of the disclosure enable rapid removal of material without edge chipping. Comparatively, when two straight traverse passes are used to remove material the resulting honeycomb body can experience edge chipping. Edge chipping can be reduced by slowing the traverse speed or taking less material off in more passes both of which result in slower manufacture and inefficient part production. According to exemplary embodiments of the disclosure these issues can be addressed resulting in rapid part generation with no edge chipping.

Figure 2:
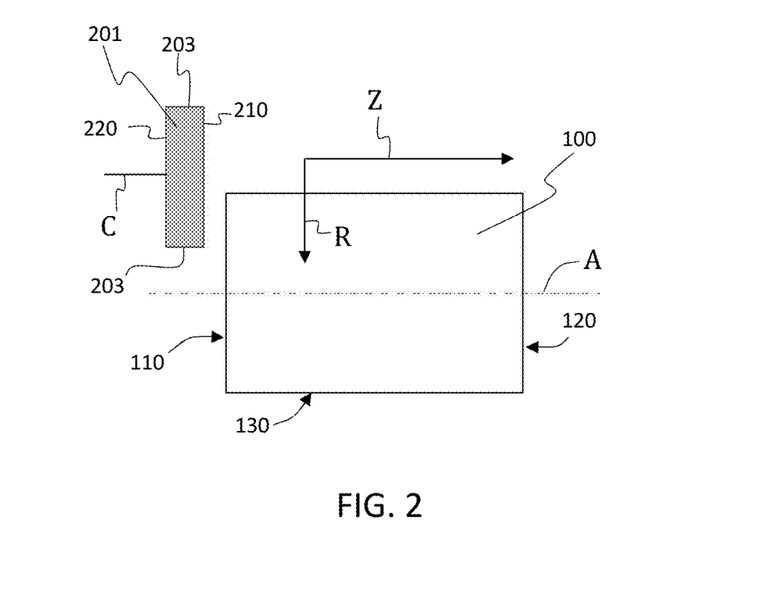
FIG. 2 is a side view of a honeycomb body and a grinding wheel showing a starting position in a method of contouring a honeycomb body according to exemplary embodiments of the present disclosure.

FIG. 2 is a side view of a honeycomb body 100 and a grinding wheel 201 showing a starting position in a method of contouring a honeycomb body according to exemplary embodiments of the present disclosure. Referring to FIG. 1A and FIG. 2, the grinding wheel 201 rotates about central axis "C" in a direction indicated by arrow "D". While the rotation direction is indicated as in positive "D" direction, the grinding wheel 201 can also rotate in a negative "D" direction. A motor and axle (not shown) can rotate the grinding wheel 201 at various angular velocities, and a spindle (not shown) can translate the rotating grinding wheel 201 relative to the honeycomb body 100 at various translation velocities in axial and radial directions. Axial direction "Z" is indicated in FIG. 2 as parallel to central axis "A" of the honeycomb body 100 and radial direction "R" is indicated as parallel to a radius extending from central axis "A".

Honeycomb body 100 can be held in a chuck (not shown) and rotated about central axis "A" in a direction indicated by arrow "B". While the rotation direction is indicated as positive "B" direction, the honeycomb body can also rotate in negative "B" direction. A motor (not shown) can rotate the chuck and honeycomb body 100 at various angular velocities, and a chuck spindle (not shown) can translate the rotating honeycomb body 100 relative to the grinding wheel 201 at various translation velocities in axial and radial directions.

The desired shape and diameter of the closed cylinder finished honeycomb body is generated by relative movement between the axis of rotation "C" of rotating grinding wheel 201 and honeycomb body 100. This relative movement may be carried out by a movement of the spindle in "Z" and "R" directions. Movement can be effected, for example, under the control of a programmable computer (not shown) possessing software specific to the product design desired. Thus, it is feasible to produce different shapes (round and non-round) using the contouring set-up disclosed in FIGS. 1A and 2 just by changing the software program, i.e. the relative movements between the grinding wheel 201 and honeycomb body 100.

According to exemplary embodiments of a method of contouring a honeycomb body, to start the process the grinding wheel 201 can be positioned spaced apart from the first end face 110 such that the resulting cut if the grinding wheel 201 traversed axially (in the "Z" direction) would result in a honeycomb body either of the same as the final desired shape and diameter or slightly larger. The starting position is shown in FIG. 2 relative to the honeycomb body 100 prior to contouring. The grinding wheel 201 has a peripheral grinding surface 203, a first side grinding surface 210, and a second side grinding surface 220 to remove material from the honeycomb body 100. The honeycomb body 100 rotates with a first angular velocity about central axis "A" and the grinding wheel 201 rotates with a second angular velocity about central axis "C".

Figure 3:
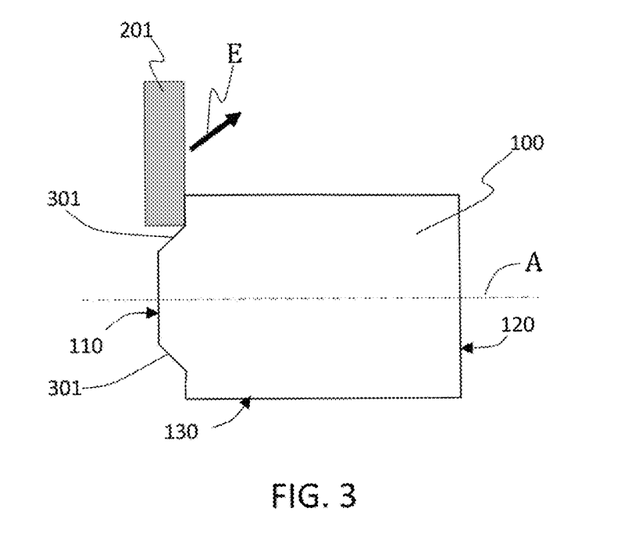
FIG. 3 is a side view of the honeycomb body and grinding wheel of FIG. 2 showing chamfering material removal at a first end in the method of contouring a honeycomb body according to exemplary embodiments of the present disclosure.

According to exemplary embodiments of the method, the grinding wheel 201 traverses axially toward the honeycomb body 100 until the first side grinding surface 210 contacts the first end face 110 or comes within imminent proximity (almost touches). Referring to FIG. 3, at this point the grinding wheel 201 translational motion will change to a diagonal motion which consists of a component moving axially and a component moving radially at the same time to remove material from the honeycomb body 100 to chamfer a corner at the first end face 110 toward the first contour 130 in direction "E" to form a second contour 301. FIG. 3 is a side view of the honeycomb body 100 and grinding wheel 201 showing chamfering material removal at the first end face 110 in the method of contouring the honeycomb body 100 according to exemplary embodiments of the present disclosure.

While the movement is described as the grinding wheel 201 moving, the disclosure is not so limited, that is the honeycomb body 100 can move, and further, both the grinding wheel 201 and the honeycomb body 100 can move. As mentioned, it is the relative motion of the grinding wheel 201 to the honeycomb body 100 that produces the desired contoured honeycomb body shape and diameter.

Figure 4:
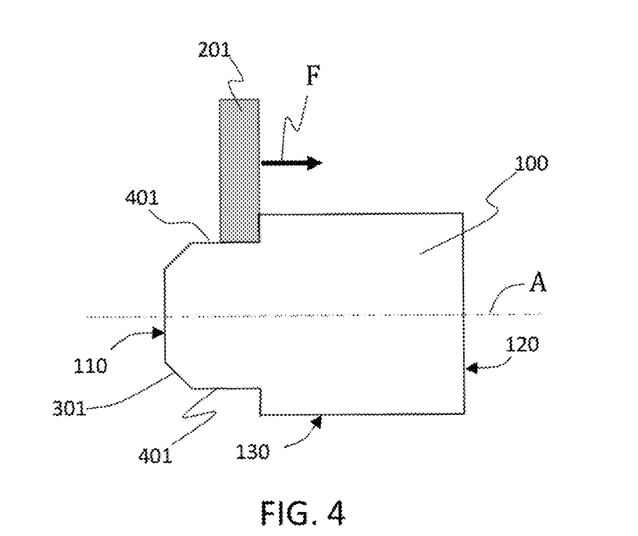
FIG. 4 is a side view of the honeycomb body and grinding wheel of FIG. 3 showing axial material removal in the method of contouring a honeycomb body according to exemplary embodiments of the present disclosure.

Turning to FIG. 4, according to exemplary embodiments of the method, the grinding wheel 201 reaches a radial position which can be approximately equal to the final desired radius plus a finish path depth, and then the grinding wheel 201 can stop radial movement and continue axial motion. FIG. 4 shows axial material removal in direction "F" toward the second end face 120 to form a third contour 401 in the method of contouring the honeycomb body 100.

Figure 5:
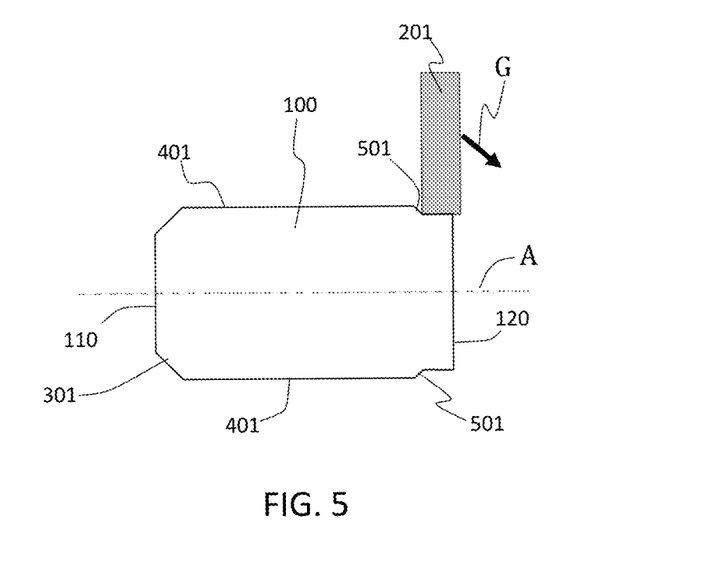
FIG. 5 is a side view of the honeycomb body and grinding wheel of FIG. 4 showing chamfering material removal at a second end in the method of contouring a honeycomb body according to exemplary embodiments of the present disclosure.
Figure 11A:
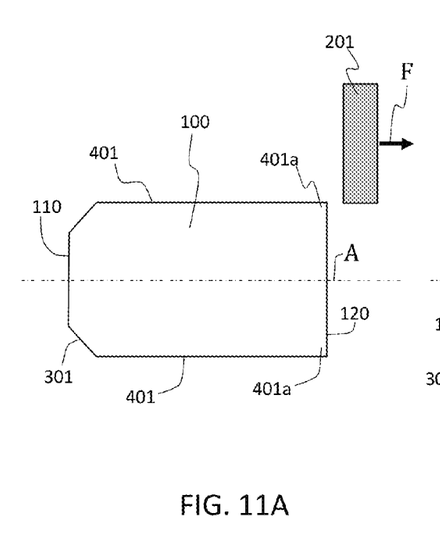
FIGS. 11A and 11B are side views of a honeycomb body and grinding wheel of FIG. 4 showing the grinding wheel at an alternative reversing position in the method of contouring a honeycomb body according to exemplary embodiments of the present disclosure.
Figure 11B:
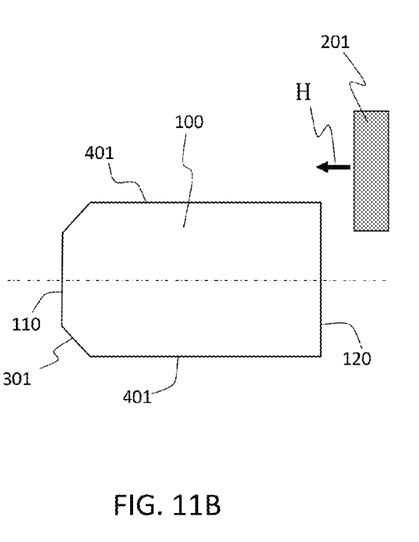
Figure 11C:
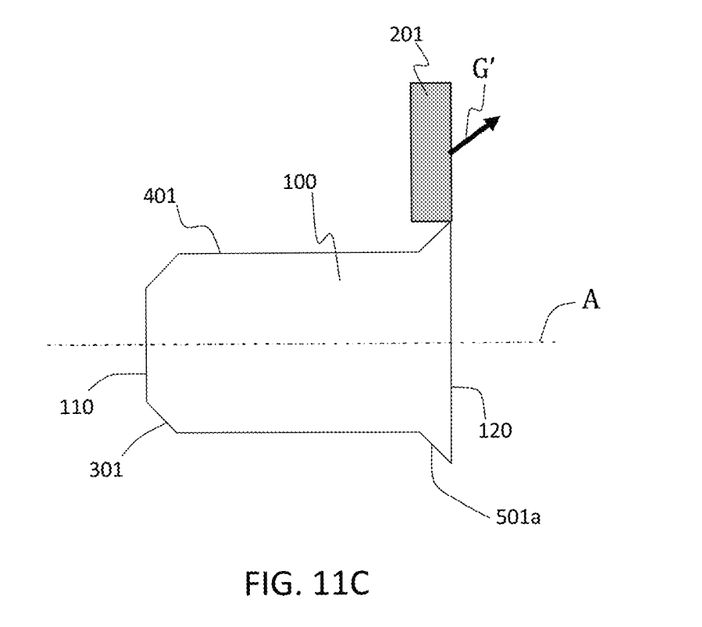
FIG. 11C illustrates a side view of a honeycomb body and grinding wheel of FIG. 4 showing an alternative end contour in the method of contouring a honeycomb body according to exemplary embodiments of the present disclosure.

Once the first side grinding surface 210 exits the honeycomb body 100, that is, extends just beyond the second end face 120, the grinding wheel 201 motion switches again to coordinated motion combining axial and radial motion to create an exit chamfer. FIG. 5 is a side view of the honeycomb body 100 and grinding wheel 201 showing chamfering material removal at the second end face 120 to form an end contour 501. The grinding wheel 201 direction of coordinated motion combining axial and radial motion to create the end chamfer 501 is illustrated in FIG. 5 by arrow "G". Forming the end chamfer 501 may not be necessary to avoid edge chipping in all aspects, but can be included in the method to eliminate movement of the grinding wheel 201 relative to the honeycomb body 100 once the grinding wheel 201 has exited the honeycomb body 100. Referring to FIG. 11A, when forming the end chamfer 501 is removed from the method, the grinding wheel 201 continues to move axially (direction indicated by arrow "F") until it has exited the honeycomb body 100, that is, until the second grinding side 220 has extended beyond the second end face 120. In this embodiment, a corner 401a where third contour 401 meets second end face 120, may chip. Such a chip may be removed during subsequent grinding of the honeycomb body 100 to the final desired diameter and shape. FIGS. 11A and 11B show the grinding wheel 201 as it exits the honeycomb body 100, translates radially to a position ready for making a finishing pass, and reverses direction for the finishing pass in direction indicated by arrow "H". FIG. 11C illustrates forming an alternative end contour 501a in the method of contouring a honeycomb body according to exemplary embodiments of the present disclosure. In forming an alternative end contour 501a, the grinding wheel 201 may move in a combination of axial and radial directions relative to honeycomb body 100 indicated by arrow "G'".

Figure 6:
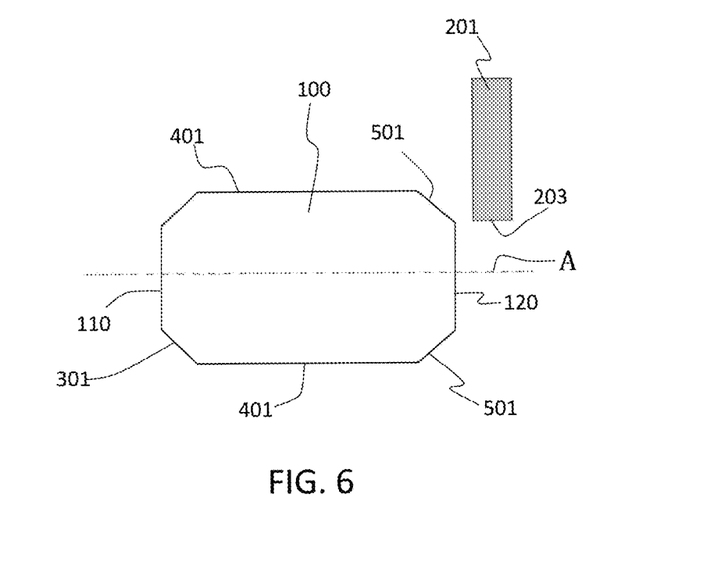
FIG. 6 is a side view of the honeycomb body and grinding wheel of FIG. 5 showing the grinding wheel at a reversing position in the method of contouring a honeycomb body according to exemplary embodiments of the present disclosure.
Figure 7:
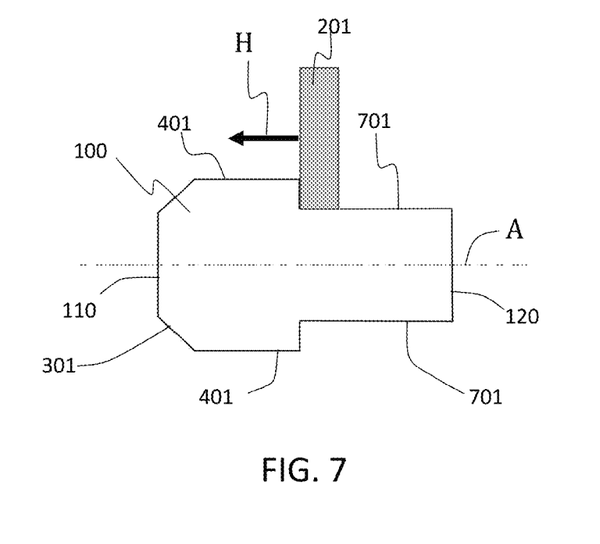
FIG. 7 is a side view of the honeycomb body and grinding wheel of FIG. 6 showing axial material removal in the method of contouring a honeycomb body according to exemplary embodiments of the present disclosure.

Returning to FIG. 6, after forming the end contour 501, the grinding wheel 201 continues to move radially and axially until the distance between the peripheral grinding surface 203 and the honeycomb central axis "A" is equal to the desired radius of the final honeycomb body. By forming the end chamfer the grinding wheel 201 is closer to a reversing position ready to form the finishing contour than in the alternative embodiment where the end chamfer is not formed (FIGS. 11A and 11B) or where an alternative end contour 501a is formed. Once the grinding wheel 201 reaches the final honeycomb 100 radial distance it will traverse axially toward the first end face 110 in the direction indicated by arrow "H" across the length of the honeycomb body 100 as shown in FIG. 7. The grinding wheel 201 can substantially remove the end contour 501 without removing remaining material from the second end face 120 when forming the fourth contour. Alternatively, the grinding wheel 201 can leave a portion of the end contour 501 in a region adjoining the second end face 120 when forming the fourth contour. The remaining portion of the end contour may be a desired end bevel edge. This end bevel edge may extend from 0.001" (25.4 microns) to 0.020" (508 microns), for example, from 0.002" (50.8 microns) to 0.010" (254 microns), or even 0.004" (102 microns) to 0.008" (203 microns).

Figure 8:
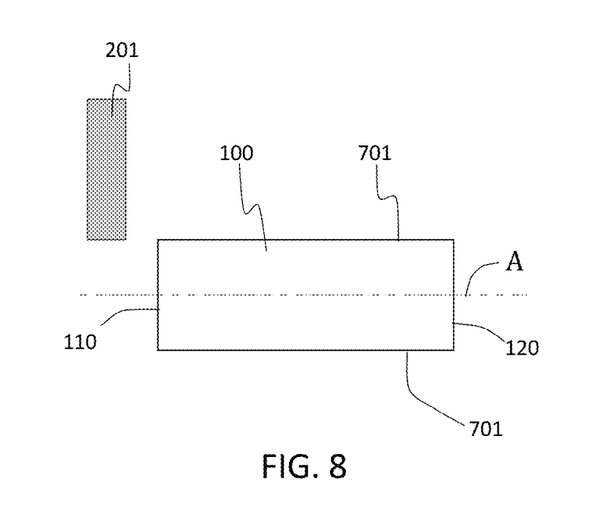
FIG. 8 is a side view of the honeycomb body and grinding wheel of FIG. 7 showing the grinding wheel at a finished position in the method of contouring a honeycomb body according to exemplary embodiments of the present disclosure.

FIG. 7 shows axial material removal in a direction toward the first end face 110 to form a fourth contour 701 in exemplary embodiments of the method. The fourth contour 701 can be the final finished outer periphery of the honeycomb body 100. As mentioned above, the final finished outer periphery of the honeycomb body 100 may subsequently be skinned. FIG. 8 shows the grinding wheel 201 at a finished position in the method of contouring the honeycomb body 100 according to exemplary embodiments.

Figure 9A:
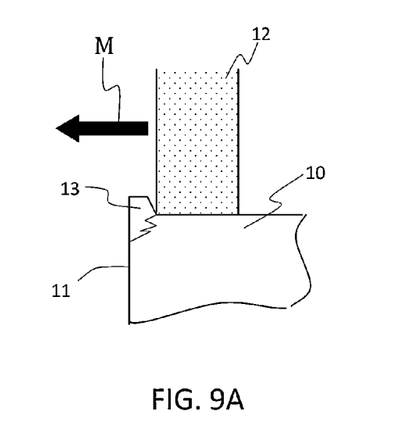
FIG. 9A shows a side view detail of a grinding wheel axial material removal at an end face of a honeycomb body according to a comparative embodiment.

As shown in FIG. 9A by reducing the amount of cutting (radial material removal) of the honeycomb body 10 by the grinding wheel 12 in a pass, in a comparative embodiment the size of a chip 13 removed from the honeycomb body 10 at the first end face 11 can be reduced, whereby the honeycomb body 10 may be acceptable. However, the method shown in FIG. 9A may require a large number of cutting operations (axial passes of the grinding wheel 201 at incremental radii) until the honeycomb structure 11 has a desired outer diameter, whereby the processing time is increased.

Figure 9B:
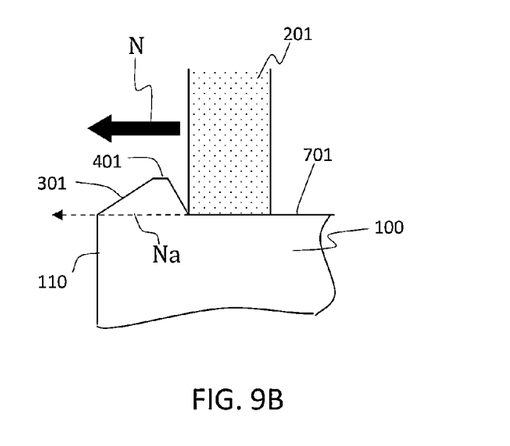
FIGS. 9B, 9C, and 9D show side view details of grinding wheel axial material removal at end faces of honeycomb bodies according to various exemplary embodiments of the disclosure.
Figure 9C:
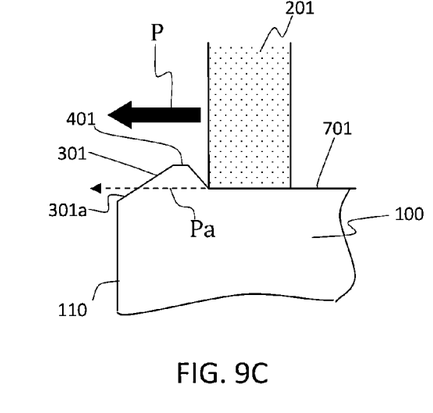
Figure 9D:
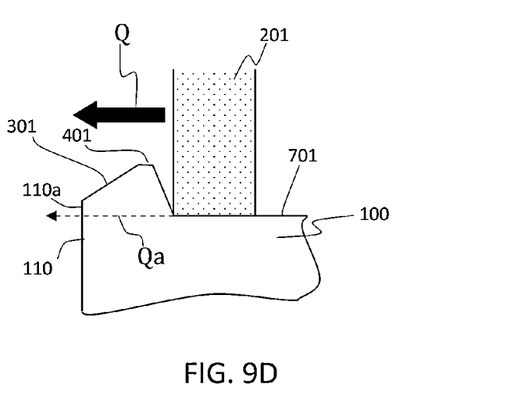

FIGS. 9B, 9C, and 9D show side view details of grinding wheel axial material removal at end faces of honeycomb bodies according to various exemplary embodiments of the disclosure. FIG. 9B depicts the grinding wheel 201 forming the fourth contour 701. While the grinding wheel 201 translates axially in direction indicated by arrow "N", fourth contour 701 will extend along arrow "Na". Forming the fourth contour 701 to form the final desired outer diameter and shape may remove the second contour 301 and the third contour 401 without removing remaining material from the first end face 110 according to exemplary embodiments shown in FIG. 9B.

FIG. 9C depicts the grinding wheel 201 forming the fourth contour 701 according to another exemplary embodiment. While the grinding wheel 201 translates axially in direction indicated by arrow "P", fourth contour 701 will extend along arrow "Pa". Forming the fourth contour 701 to form the final desired outer diameter and shape may remove most of the second contour 301 and the third contour 401 while leaving a second contour portion 301a without removing remaining material from the first end face 110 according to exemplary embodiments. Such a second contour portion 301a may be a desired bevel edge. The second contour portion 301a may extend from 0.001" (25.4 microns) to 0.020" (508 microns), for example, from 0.002" (50.8 microns) to 0.010" (254 microns), or even 0.004" (102 microns) to 0.008" (203 microns).

FIG. 9D shows the grinding wheel 201 forming the fourth contour 701 according to another exemplary embodiment. While the grinding wheel 201 translates axially in direction indicated by arrow "Q", fourth contour 701 will extend along arrow "Qa". Forming the fourth contour 701 to form the final desired outer diameter and shape may remove the second contour 301, the third contour 401, and a first end face portion 110a according to exemplary embodiments. The first end face portion 110a may extend from 0.001" (25.4 microns) to 0.020" (508 microns), for example, from 0.002" (50.8 microns) to 0.010" (254 microns), or even 0.004" (102 microns) to 0.008" (203 microns).

Figure 10A:
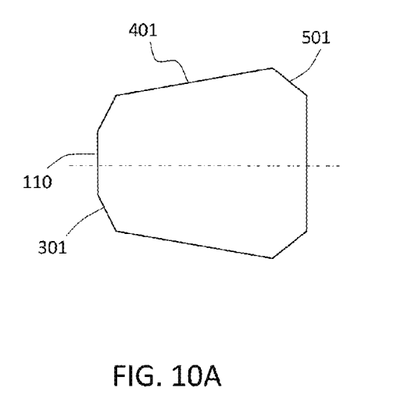
FIG. 10A shows a side view of a honeycomb body after contouring three surfaces in a method according to exemplary embodiments of the disclosure.
Figure 10B:
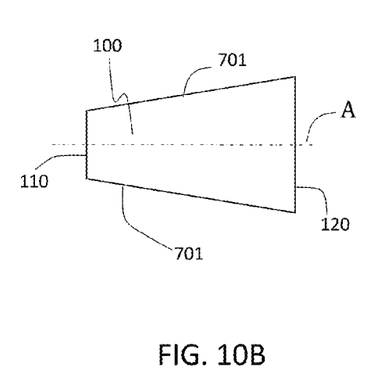
FIG. 10B shows a side view of the honeycomb body of FIG. 10A after a finishing contour in the method according to exemplary embodiments of the disclosure.

FIG. 10A shows a honeycomb body 100 after contouring three surfaces in a method according to exemplary embodiments of the disclosure. FIG. 10B shows the honeycomb body 100 of FIG. 10A after a finishing contour in the method according to exemplary embodiments of the disclosure.

According to the various exemplary embodiments, the grinding wheel 201 can machine the second contour, the third contour, and the end contour by rapidly translating the grinding wheel 201 radially and axially relative to the honeycomb body 100 as described, followed by translating the grinding wheel 201 relative to the honeycomb body 100 axially as described at a slower rate to machine the fourth contour.

Accordingly, exemplary embodiments of the disclosure enable substrates to be quickly machined down to a precise diameter and shape while eliminating edge chipping. Exemplary embodiments of the disclosure describe a method that uses coordinated motion to create chamfers on the ends of a substrate while removing the majority of material in a first pass and then completes the part with a final axial traverse pass to final diameter and shape.

It will be apparent to those skilled in the art that various modifications and variations can be made in the disclosed exemplary embodiments without departing from the spirit or scope of the claims. Thus, it is intended that the present claims cover the modifications and variations of this disclosure provided they come within the scope of the claims and their equivalents.

What is claimed is:

1. A method of manufacturing a honeycomb structure, the method comprising:

providing a honeycomb body comprising a first contour extending between opposing first and second end faces;

chamfering a corner of the first end face in a radial and axial direction toward the first contour to form a second contour;

removing material in an axial direction toward the second end face to form a third contour, wherein removing material to form the third contour begins before the second contour extends all the way to the first contour; and removing material in an axial direction toward the first end face to form a fourth contour.

2. The method of manufacturing a honeycomb structure of claim 1, wherein the providing comprises providing a green honeycomb body.

3. The method of manufacturing a honeycomb structure of claim 1, wherein the providing comprises providing a fired ceramic honeycomb body.

4. The method of manufacturing a honeycomb structure of claim 1, wherein removing material to form the fourth contour comprises extending the fourth contour to the first end face.

5. The method of manufacturing a honeycomb structure of claim 4, wherein removing material to form the fourth contour substantially removes the second contour without removing remaining material from the first end face.

6. The method of manufacturing a honeycomb structure of claim 1, wherein removing material to form the fourth contour comprises extending the fourth contour to the second contour.

7. The method of manufacturing a honeycomb structure of claim 1, further comprising chamfering a corner of the third contour in a radial and axial direction toward the second end face to form an end contour before forming the fourth contour.

8. The method of manufacturing a honeycomb structure of claim 7, wherein removing material to form the fourth contour substantially removes the end contour without removing remaining material from the second end face.

9. The method of manufacturing a honeycomb structure of claim 7, wherein removing material to form the fourth contour leaves at least a portion of the end contour.

10. The method of manufacturing a honeycomb structure of claim 1, wherein chamfering comprises:

rotating the honeycomb body in a first angular direction about a first axial direction, rotating a grinding wheel in a second angular direction about a second axial direction; and contacting the grinding wheel and the honeycomb body.

11. The method of manufacturing a honeycomb structure of claim 10, wherein the first axial direction and the second axial direction are parallel.

12. The method of manufacturing a honeycomb structure of claim 10, wherein the first axial direction and the second axial direction are non-parallel.

13. The method of manufacturing a honeycomb structure of claim 10, wherein rotating the honeycomb body in the first angular direction comprises rotating at a first angular velocity, and rotating the grinding wheel in the second angular direction comprises rotating at a second angular velocity greater than the first angular velocity.

14. The method of manufacturing a honeycomb structure of claim 10, wherein contacting the grinding wheel and the honeycomb body comprises translating the grinding wheel past the honeycomb body in at least one of an axial and radial direction.

15. The method of manufacturing a honeycomb structure of claim 14, wherein translating the grinding wheel past the honeycomb body comprises translating the grinding wheel at a first translation velocity to form at least one of the second contour and the third contour, and translating the grinding wheel at a second translation velocity less than the first translation velocity to form the fourth contour.

16. The method of manufacturing a honeycomb structure of claim 10, wherein contacting the grinding wheel and the honeycomb body comprises translating the honeycomb body past the grinding wheel in at least one of an axial and radial direction.

17. The method of manufacturing a honeycomb structure of claim 16, wherein translating the honeycomb body past the grinding wheel comprises translating the honeycomb body at a first translation velocity to form at least one of the second contour and the third contour, and translating the honeycomb body at a second translation velocity less than the first translation velocity to form the fourth contour.

18. A method of manufacturing a honeycomb structure, the method comprising:
prov)iding a honeycomb body comprising a central axis and a first contour extending between opposing first and second end faces;
chamfering a corner of the first end face in a radial and axial direction toward the first contour and away from the central axis to form a second contour; and
removing material in an axial direction toward the second end face to form a third contour, wherein removing material to form the third contour begins before the second contour extends all the way to the first contour.

19. The method of manufacturing a honeycomb structure of claim 18, wherein the providing comprises providing a fired ceramic honeycomb body.

20. The method of manufacturing a honeycomb structure of claim 18, further comprising:
removing material in an axial direction toward the first end face to form a fourth contour.

* * * * *

UNITED STATES PATENT AND TRADEMARK OFFICE
CERTIFICATE OF CORRECTION

PATENT NO. : 10,000,031 B2
APPLICATION NO. : 14/480941
DATED : June 19, 2018
INVENTOR(S) : Kevin Eugene Elliott Page 1 of 1

It is certified that error appears in the above-identified patent and that said Letters Patent is hereby corrected as shown below:

On the Title Page

In Column 2, item (56), U.S. Patent Documents, Line 10, delete "Eiehelnerger et al." and insert -- Eichelnerger et al. --, therefor.

Signed and Sealed this
Seventeenth Day of March, 2020

Andrei Iancu
*Director of the United States Patent and Trademark Office*